United States Patent [19]  [11] 4,199,109
Watanabe  [45] Apr. 22, 1980

[54] METHOD FOR RECOVERING DIFFERENT PLASTIC MATERIALS FROM LAMINATED ARTICLES

[75] Inventor: Tadao Watanabe, Tokyo, Japan

[73] Assignee: Toppan Printing Co., Ltd., Japan

[21] Appl. No.: 917,351

[22] Filed: Jun. 20, 1978

[51] Int. Cl.² .................. B02C 23/08; B32B 31/18
[52] U.S. Cl. .................................... 241/14; 241/23; 241/24; 156/344; 209/11
[58] Field of Search ............... 241/23, 24, 14, 30; 156/344; 209/11

[56] References Cited

U.S. PATENT DOCUMENTS 3,926,790  12/1975  Jzumi .............................. 209/11 X
4,086,083  4/1978  Michael et al. .................. 241/23 X

FOREIGN PATENT DOCUMENTS 50-35956  11/1975  Japan ............................. 241/24
51-9168   1/1976   Japan ............................. 241/23
7407833   12/1974  Netherlands ..................... 241/23

Primary Examiner—Richard B. Lazarus
Attorney, Agent, or Firm—Lerner, David, Littenberg & Samuel

[57] ABSTRACT

A method for recovering plastics which is easy in working and effective in separation of materials. The method comprises the steps of: heating multilayer plastic articles, immediately crushing the heated plastic articles by means of shearing, impact or tearing force and peeling the layers of the plastic articles into small pieces of respective component layer materials, and separating the crushed and peeled pieces of materials into the respective component layer materials, thereby recovering the component layer materials in separated state.

12 Claims, 3 Drawing Figures

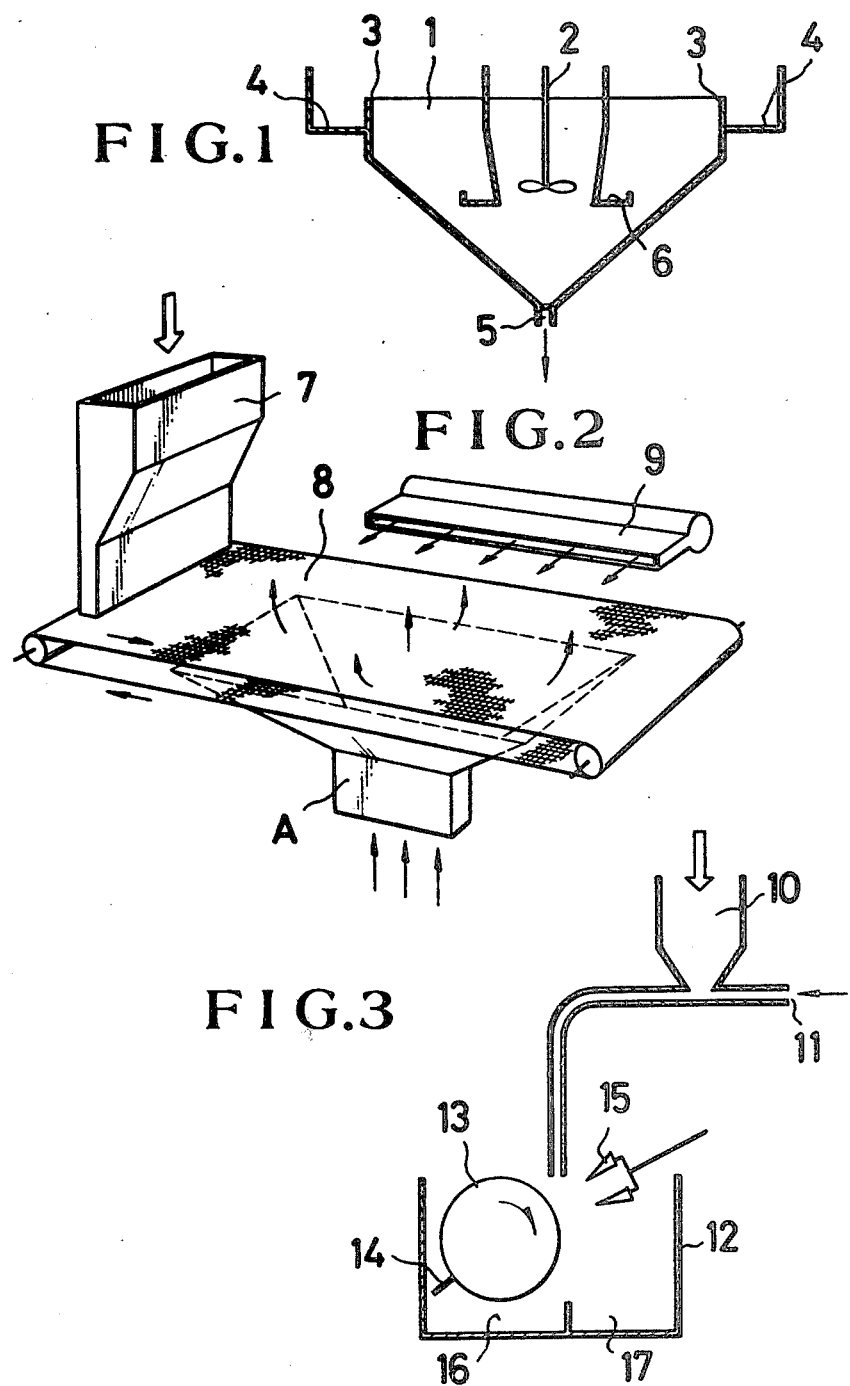

METHOD FOR RECOVERING DIFFERENT PLASTIC MATERIALS FROM LAMINATED ARTICLES

BACKGROUND OF THE INVENTION

1. Field of the Invention

This invention relates to a method for recovering multilayer plastics. More particularly, the multilayer plastics to which this invention can be applied, consists of, for example, a first layer of nylon or the saponified product of ethylene-vinyl acetate copolymer and a second layer of polyethylene or polypropylene or those containing extender pigments and/or reformed resins. The multilayer plastics are heated to 80° to 200° C. according to their component resins and immediately after that the heated material is peeled and crushed into the respective layer component resins by shearing force, impact force and tearing force. The crushed materials are then separated into two groups, one floats on water and the other sinks in water by the difference in their specific gravity, or separated by air current with the difference in their bulk densities which comes from the difference in their sizes and shapes, or the crushed products are recovered as the component resins by separately attracting to a positive electrode or a negative electrode with utilizing the difference in their dielectric constants or their electric resistances.

2. Description of the Prior Art

In the conventional art, single component plastic articles are often crushed into small pieces and they are used again by being heated, melted and extruded into certain shapes by extruders or the like, and the recovered products are used for several purposes.

In recent years, the technique of multilayer plastic formation has been developed in which the products such as bottles are made of multilayer materials consisting of different resins. With the development of this technique, it has become necessary to separate and reclaim the multilayer component resins.

Even when the multilayer plastics are crushed in like manner as the crushing of single component articles, since the plastic layers are bonded tightly, the multilayer plastics are only crushed into small pieces with their multilayer structure so that only the mixture of resin materials can be obtained, and only the articles made of the mixture of resins can be produced by the use of such a crushed material. The interlayer adhesive strength of a multilayer product is generally large to a considerable degree and when the multilayer products of the first layer of polyamide or the saponified ethylene-vinyl acetate resin and the second layer of polyethylene or polypropylene, are crushed at an ambient temperature, both the layers are simultaneously crushed in the laminated state since the tensile strengths of them are not so large. Accordingly, when such a crushed material is used in the reclaiming, the temperature of melting resin material must be raised to the point which is 20° to 30° C. higher than the high melting points of polyamide or saponified ethylene-vinyl acetate resin. Further, the recovered resin is defective in its transparency, surface property, antistress property and adhesive property. Therefore, it is necessary to eliminate such undesirable properties by using or mixing several percents of the recovered material into a fresh material. Further, the workability in molding is lowered and the production cycle becomes long. Accordingly, the most part of the crushed material has to be discarded. If the laminated material can be separated into its component materials, the whole of them can be reused which is quite advantageous in industrial view point. However, the complicated and expensive separation method must be avoided.

BRIEF SUMMARY OF THE INVENTION

In view of the above-described prior art circumstances, the inventor of the present application has carried out a wide variety of investigations, and as the result, the present invention has been accomplished.

It is, therefore, the primary object of the present invention to provide an improved method for recovering plastics in which the component resins can be recovered quite easily, effectively and inexpensively.

Another object of the present invention is to provide a method for recovering plastics which can be put into practice without difficulty at low cost.

A further object of the present invention is to provide a method for recovering plastics which can be applied to the separation of a wide variety of multilayer plastic articles.

In accordance with the present invention, the method for recovering plastics comprises the steps of: heating multilayer plastic articles, immediately crushing the heated plastic articles by means of shearing, impact or tearing force and peeling the layers of the plastic articles into small pieces of respective component layer materials, and separating the crushed and peeled pieces of materials into the respective component layer materials, thereby recovering the component layer materials in separated state.

In an aspect of the present invention, the multilayer plastic articles contain at least a layer of nylon or saponification product of ethylene-vinyl acetate copolymer, and another layer may consists of polyethylene or polypropylene or those containing extender pigments and/or reformed resins.

Further, in the method of the present invention, the separation of the crushed materials are carried out with the differences in specific gravities, sizes, shapes, or electrical properties of them.

BRIEF DESCRIPTION OF THE DRAWINGS

These and other objects and features of the present invention will become more apparent from the following description taken in connection with the accompanying drawings, in which:

FIG. 1 is a schematic illustration of an apparatus for separating the crushed pieces of materials according to the present invention in which the difference in specific gravities is utilized;

FIG. 2 is also a schematic illustration of another apparatus for separating the crushed pieces of materials with the differences in sizes and shapes thereof; and FIG. 3 is a schematic illustration of a further apparatus for separating the crushed pieces of materials with the difference in electrical properties thereof.

DETAILED DESCRIPTION OF THE INVENTION

The method of the present invention will be described in detail in the following.

In the method for recovering plastics of the invention, the multilayer plastic articles must be crushed into small pieces. The multilayer plastic articles are firstly heated in an oven to 80° to 200° C., and immediately after that, the heated plastic articles are put into a crusher so as to crush and peel the plastic articles into small pieces of layer component materials. The heating temperature may be set at a point a little below the melting point of the lower melting plastic component.

As the crushers used in the method of the present invention, the ordinary impact crushers such as cutter mill and rolling mill can be employed, in which the heated plastic articles come into collision with the rapidly rotating impact elements. Further, a shearing crusher can also be recommended, in which the heated plastic articles are clasped and sheared by the rotary blades and stationary blades in the crushing chamber. In both types of crushers, the large crushing effect is given not only by the shearing and impact force but also by the frictional force. The above two types of crushers are characterized in that both brittle and malleable materials can be crushed without fail since sharp edges are utilized in crushing. Of course, the crushing conditions, for example, the gap between rotary blades and stationary blades must be regulated to proper values. The hammer of the rotary blade in the above crusher has a rotational frequency of 1,000 to 3,500 r.p.m. and a circumferential speed of 10 to 25 m/sec, so that the capacity of the motor may be 150 to 300 w per 1 cm of the blade width.

It is necessary that the crushing operation is continued until the particle size of the crushed multilayer plastic pieces becomes below a certain value. When long crushing operation is performed, the crushed material becomes fine and the peeling of layer materials becomes good. However, it is to be noted that, since the particle size of the crushed material gives an influence to the effect of the succeeding separation step, the particle size must be selected according to the kind of next separation step.

In the methods to separate by the difference in specific gravities in water and to separate by the difference in dielectric constants, smaller particle sizes are preferred. In these cases, the desirable particle sizes are in the range of 0.5 to 5.0 mm in the screen mesh opening. In the method to separate the crushed material by the difference in the shapes of particles with using air current, very small particles are not suitable since the selectivity with the difference in shapes becomes low, therefore, 3 to 8 mm in screen mesh opening is preferred.

Furthermore, when the rotational frequency of the rotary blades of crusher is increased, the crushing force becomes larger and the plastic articles are heated by the shearing heat in the crushing chamber, so that the interlayer adhesive strength is reduced and the peeling of the layer materials becomes effective.

The method of the present invention will be further described with reference to several examples.

EXAMPLE 1

Blow-molded articles consisting of the double layers of an outer polyamide resin layer and an inner low density polyethylene layer, were heated to 140° C. by using an oven, and immediately after that, they were crushed by a high speed rotary shearing crusher. In the crusher, the blade width was 100 mm, the diameter was 100 mm, the power was 3 kw at 2500 r.p.m. and the diameter of the screen was 5 mm. The crushed product was immediately cooled with air and separated through the following procedure.

Since the polyamide resin and the polyethylene resin were previously colored with different coloring agents, the crushed products were separated by hand according to their colors.

The rate of separation was calculated by the weight of obtained polyamide resin component according to the following equation:

$$\text{(Rate of Separation)} = \frac{\text{Weight of obtained polyamide component}}{\text{(Weight of sample)}} \times \frac{\text{Weight ratio of polyamide in molded product}}{} \times 100$$

The calculated rate of separation was almost 100%. This rate of separation is about 5% at normal temperature and it increases abruptly from the temperature near 80° C. When the molded product is heated above 200° C., the crushed product is sometimes fused together into a lump, therefore, it is desirable that the present invention is worked in the range of 80° to 200° C.

In the above-described example, the resins were separated by the manual work, however, the separation is not restricted to that. In the following, other separation methods will be described with reference to the accompanying drawings.

FIGS. 1 to 3 show the separation methods for the peeled and crushed products according to the present invention.

In the method shown in FIG. 1, the resins are separated by the difference in specific gravities of the resins. For example, the specific gravity of polyamide is 1.13 and that of low density polyethylene is 0.91. The mixture of both resins and water is introduced into the dispersing chamber 1 and it is stirred with a stirrer 2. The resin that is lighter than water (low density polyethylene) rises to the surface and is collected into the overflow chamber 4 passing across the overflow edge 3. The resin that is heavier than water (polyamide) settles down and is taken out from the outlet 5 together with water, and after that, the resin is recovered by filtration. The resin chips that are not peeled are collected into the intermediate settling chamber 6 and taken out together with water by pump.

FIG. 2 shows the method to separate resins by the differences in sizes and shapes. For example, the chip of a peeled polyamide resin is in the shape of a leaflet, while the peeled particle of polyethylene is granular. Therefore, the former is liable to be blown off by wind as compared with the latter one. Thus, the resin mixture is dropped onto a net conveyor 8 through a hopper 7 and is moved on the conveyor 8, wherein air is blown from the flower air inlet A. Thus, the resin particles are floated above the conveyor in which the polyamide is shifted up higher. While, air is blown form the air slot 9 which is disposed above one side of the conveyor 8 so that only the polyamide can be blown aside the conveyor 8 and is collected separately. The volume and velocity of the air supply and the position of the side air slot 9 may be determined in accordance with each practical case.

The method shown by FIG. 3 utilizes the difference in the dielectric constant or volume resistivity of the resin. That is, the resin mixture is fed through the resin inlet 10 and air is introduced from the air inlet 11, thereby the resin mixture is fed into the main body 12 of the separator. These resins are charged with electricity by the friction in this step. The main body 12 of the separator is provided with a rotary negative electrode 13, a doctor blade 14 and stationary positive electrodes 15 and d.c. high voltage is applied across the negative electrode 13 and the positive electrodes 15. Among the fed resins, the one which is small in volume resistivity and large in dielectric constant is caught by the rotary negative electrode 13 and scraped off by the doctor blade 14. When the mixture of polyamide resin and low density polyethylene is employed, the polyamide is caught by the rotary negative electrode and scraped off by the doctor blade, while the polyethylene is collected in the recovery chamber 16. The resin having a small dielectric constant is collected into the recovery chamber 17. By the way, the dielectric constants and other specific values of several resins are shown in the following table. The exemplar value of the electric voltage between both the electrodes is 7000 to 20000 volts and the electric current may be in the range of 1 to 50 mA.

| Resin | Dielectric constant | Volume resistivity | Charging property |
| --- | --- | --- | --- |
| High density polyethylene | $2.3^{(10\ C/S)}$ | $10^{19}$ | 180 V |
| Polypropylene | 2.3 | $10^{16}$ | 125 V |
| Polypropylene (contains 10% filler) | 2.5 | $1.5 \times 10^{15}$ | 100 V |
| Polyamide | 3.4–3.9 | $10^{12} \times 10^{14}$ | — |
| Saponified product of ethylene-vinylacetate copolymer | — | — | 16 V |

The dielectric constants were measured in accordance with ASTM D 150 and the volume resistivities, with ASTM D 257. The charging properties were tested by using a rotary static tester at the number of frictional rotations of 800 to 1000 r.p.m.

Both the polyamide resin and the saponified ethylene-vinyl acetate copolymer are hygroscopic at the ordinary temperature and they contain generally 2 to 3% of moisture. Since the values of dielectric constant and volume resistivity largely vary according to the moisture content, and even though there is no data thereon, the above resins usually containing about 3 to 4% of moisture have quite different charging properties from that of polyolefin, thereof, the separation is possible by applying such properties.

EXAMPLE 2

The condemned products of blow-molded articles and the flashes in the molding operation were used. In the molded products, the outer layer of saponified ethylene-vinyl acetate and the inner layer of polypropylene were laminated with using an adhesive of maleic modified polypropylene resin. The adhesion strength of the adhesive was 100 g/15 mm and the thickness of the outer layer was about 15% to the total thickness. They were firstly heated by an oven to 180° C. with the supply of hot air. For the size reduction, a high speed rotary shearing crusher was used. In the crusher, the blade width was 120 mm, the diameter was also 120 mm, the power was 2.5 kw at 3200 r.p.m. and the diameter of the screen was 5 mm. Owing to the heat generation during the crushing, the temperature of crushed product was raised nearly to the melting point of polypropylene. Thus the crushed particles are liable to become lumps sticking to each other, so that they must be immediately cooled after the crushing. The crushed product was subjected to separation in water by the difference in specific gravities as shown in FIG. 1. The recovered saponified ethylene-vinyl acetate was 5% and the recovery rate to the weight of the same material before the separation was about 83%.

EXAMPLE 3

Laminated plastic products were made by blow molding in which the outer layer of high density polyethylene containing 40% of an inorganic filler (calcium carbonate) and the inner layer of polyamide resin were bonded by using a modified polyolefin resin (maleic anhydride graft modified polyethylene). The adhesion strength of the above adhesive was 200 g/15 mm and the thickness of the inner layer was 20% to the total thickness. The test in this example, the flashes obtained in the above blow molding were used. They were firstly heated to 120° C. in an oven and then crushed. The employed crusher was an impact crusher. The blade width was 100 mm, the diameter was 200 mm, the power was 2 kw at 1500 r.p.m. and the diameter of screen was 8 mm.

The adhesion strength of this sample was weak and, since it contained the filler, it can be easily peeled by the impact. The specific gravity of the outer layer containing the filler was 1.4 and that of inner layer was 1.1, both of which were larger than the specific gravity of water, therefore, they could not be separated by the method of FIG. 1 (specific gravity difference method in water). The thickness ratio of the outer layer to the inner layer was 4:1 and the polyamide resin in the crushed product was of leaf-like shape, while the polyethylene containing the filler was granular. Therefore, they were different in their bulk densities and the polyamide resin was easily blow off by air. So that they were separated according to the separation method as shown in FIG. 2 by utilizing the difference in bulk densities. The content and the recovery rate of the obtained polyamide resin were 80%.

EXAMPLE 4

The crushed product of laminated plastic article obtained in Example 1 was subjected to the separation with the difference in dielectric constants.

The surface of the rotary negative electrode 13 was plated with chromium and the stationary positive electrodes 15 were made of blass. Between both electrodes, 10 mA of d.c. current was supplied at the voltage of 13 kV. The diameter of the rotary electrode was 100 mm, the length thereof was also 100 mm and the electrode was rotated at 30 r.p.m. The rate of separation in this method with regard to the polyamide was 75%.

In the present invention having the above-described constitution, the plastic articles made of laminated different resins can be effectively separated into each component resin. The recovered single resin does not contain other resins. Since the recovered plastic material is almost the same as the plastic before the use, the recovered one can be well employed again for several purposes. Therefore, the present invention gives the quite excellent advantage.

By the way, the layered blow molded products of specific resins were exemplified in the foregoing examples, however, it should be noted that the present invention is by no means restricted to such examples and several other resins can also be applied with the method of the present invention.

It is preferred, therefore, that the present invention be limited not by the specific disclosure herein, but only by the appended claims.

What is claimed is:

1. A method for separating and recovering the plastics contained in multilayer plastic articles comprising a plurality of layers of plastic components, said method comprising heating said multilayer plastic articles, crushing said heated plastic articles by the application of shearing, impact or tearing force so as to peel the layers of said plastic articles and produce comminuted pieces of said separate plastic components, and separating said comminuted pieces of each of said separate plastic components from each other.

2. The method of claim 1 wherein said shearing, impact or tearing force is applied by means of a rapidly rotating impact element.

3. The method of claim 1 wherein said plastic articles are heated to a temperature below the lowest melting point of said plastic components.

4. The method of claim 1 wherein said temperature is between about 80° and 200° C.

5. The method of claim 1 wherein said layers of said plastic components includes at least one layer selected from the group consisting of nylon and a saponification product of ethylene vinyl acetate copolymer.

6. The method of claim 1 wherein said layers of said plastic components includes at least one layer selected from the group consisting of polyethylene, polypropylene, polyethylene combined with extender pigments or reformed resins, and polypropylene combined with extender pigments or reformed resins, and mixtures thereof.

7. The method of claim 1 wherein said comminuted pieces of each of said plastic components is separated from each other by differences in the specific gravities thereof.

8. The method of claim 7 wherein said comminuted pieces of each of said plastic components are separated from each other by placement in water whereby the comminuted pieces of one of said plastic components having a first specific gravity floats in said water and said comminuted pieces of said other of said plastic components sinks in said water.

9. The method of claim 1 wherein said comminuted pieces of each of said plastic components is separated from each other by differences in the sizes and shapes thereof.

10. The method of claim 9 wherein said comminuted pieces of each of said plastic components is separated from each other by impingement of an air current thereon.

11. The method of claim 1 wherein said comminuted pieces of each of said plastic components is separated from each other by differences in the dielectric constants thereof.

12. The method of claim 11 wherein said comminuted pieces of each of said plastic components is separated from each other by attracting said comminuted pieces of one of said plastic components to a positive electrode and by attracting said comminuted pieces of said other of said plastic components to a negative electrode.